Figure 1:
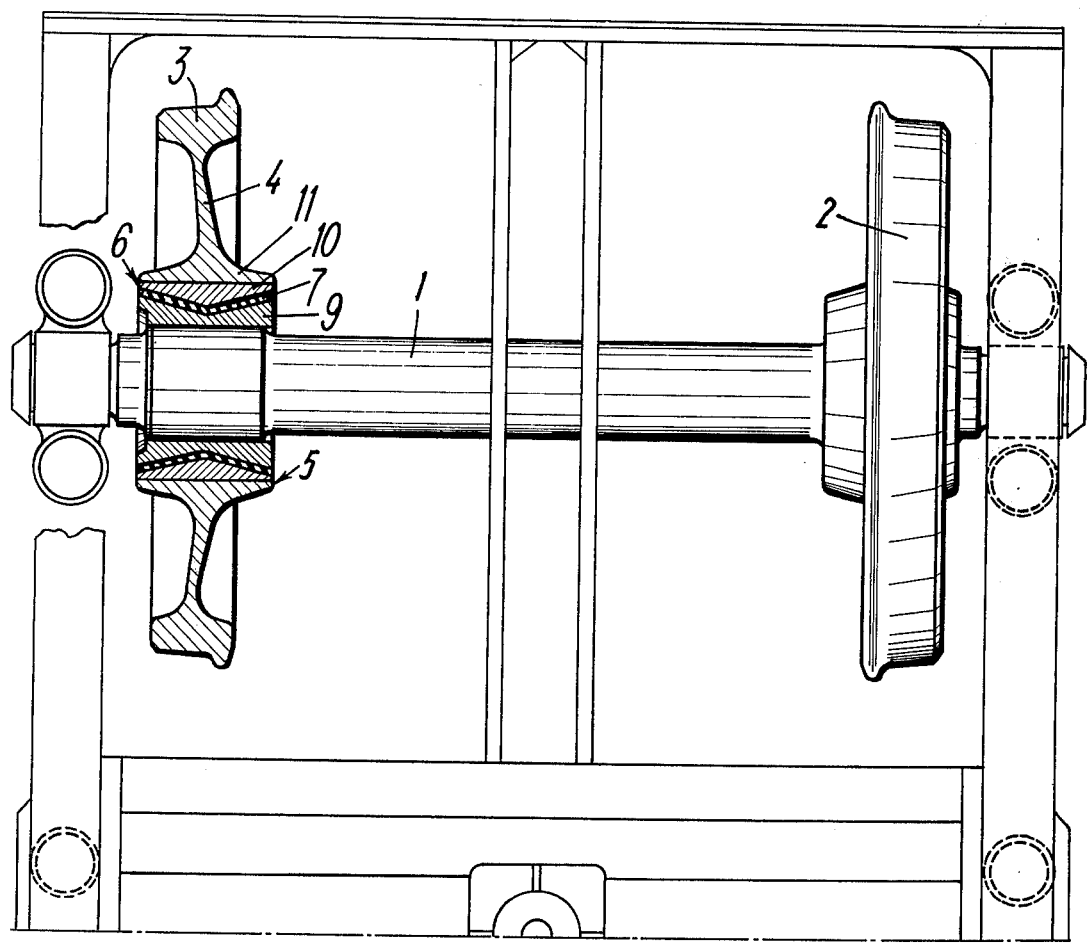

United States Patent [19]

Schindehutte et al.

[11] 4,010,972
[45] Mar. 8, 1977

[54] AXLES RESILIENTLY MOUNTING WHEELS

[75] Inventors: Manfred Schindehutte, Calden; Erwin Raquet, Sprockhovel; Helmut Licht, Bochum, all of Germany

[73] Assignee: Fried, Krupp Huttenwerke AG, Bochum, Germany

[22] Filed: Jan. 24, 1975

[21] Appl. No.: 543,907

[30] Foreign Application Priority Data

Feb. 13, 1974 Germany .......................... 2406880

[52] U.S. Cl. .................................. 295/11; 295/21; 295/35

[51] Int. Cl.² ................... B60B 9/12; B60B 17/00; B60B 27/00; B60B 37/00

[58] Field of Search .................. 295/1, 5, 7, 11, 21, 295/27, 36 R, 35; 105/165, 199 S

[56] References Cited

UNITED STATES PATENTS

| | | | |
|---|---|---|---|
| 1,982,043 | 11/1934 | Brownyer | 295/11 |
| 2,113,379 | 4/1938 | Maas | 295/11 |
| 2,477,874 | 8/1949 | Hudson | 295/11 |
| 3,101,214 | 8/1963 | Talboys | 295/1 |
| 3,394,662 | 7/1968 | Weber | 105/165 |
| 3,682,102 | 8/1972 | Pocklington et al. | 105/199 S X |

FOREIGN PATENTS OR APPLICATIONS 133,566   5/1933   Austria .............................. 295/11

*Primary Examiner*—Robert J. Spar
*Assistant Examiner*—Howard Beltran

[57] ABSTRACT

A wheel set for a bogie of a track vehicle in which wheels are mounted non-rotatably on an axle mounted in bearings of the bogie. Substantially wide rubber elastic inserts for springing each of the wheels, have an arched axial-radial cross-section. The height of the arch in radial direction is small relative to the width of the arch. The insert is arranged, furthermore, between the wheel hub and the wheel rim in the proximity of the hub boring and extending substantially over the entire width of the wheel hub. The apex of the arched insert faces the hub boring.

5 Claims, 4 Drawing Figures

AXLES RESILIENTLY MOUNTING WHEELS

The invention relates to a wheel set for a bogie of a track vehicle, especially a track vehicle for speeds of over 200 km per hour, consisting of an axis being rotatably mounted in axis bearings of the bogie and wheels sitting non-rotatably on the axis, each of said wheels being sprung by a wide rubber elastic insert having an arched or V-shaped axial-radial cross section and a small height in radial direction and being arranged between the wheel hub and wheel rim in the proximity of the hub boring and particularly extending approximately over the whole width of the wheel hub.

It is known that the top speed of a track vehicle is limited by the fact that the wheel sets between the tracks make a backward and forward movement, the so-called sinus motion. In the known bogies the wave length of the sinus motion is independent of the travelling speed, so that when the travelling speed is raised the frequency of the transverse oscillations of the wheel set is correspondingly raised. Above a specific frequency the forces of gravity result in an increase in amplitude of the transverse oscillations of the wheel set in the track and this critical velocity is the speed limit which should not be exceeded by the track vehicle.

It is known that a quite special profile results from natural wear at the wheel sets of track vehicles and it is practically independent of the initial profile of the rolling surfaces. The natural profile resulting from wear is contour stable so that very long journeys can be made without corrections to the profile. A profile having a flat conical inclination diverging from the profile resulting from wear gives an extension of the wave length of the sinus motion and consequently an increase in the speed limit, however after a relatively short journey the wheel rims assume the natural wear profile and therefore frequency have to be faced or ground down. If it were wished to travel by a vehicle for several hundred thousand kilometers without making corrections to the profile then the natural wear profile is a given size which can not be changed.

It is known that the transverse oscillations of the wheel set can be reduced by this and that the critical velocity can correspondingly be increased if the bogie is connected to the car body by means of which the rotary oscillations of the bogie frame around its vertical axis are dampened. Further known is the extension of the wave length of the simus motion by the fact that the wheel sets are positioned in the bogie or in the car so that high forces oppose movements of the wheel axis bearings in the direction of travel, i.e. the spring constant is large in the direction of travel.

The object of the invention is to create a wheel set for a bogie of a track vehicle which allows substantially higher velocities for the track vehicle than before with slight wear and great safety against derailment, both with simple bogies and bogies having a means for damping the rotary oscillations of the bogie frame around its vertical axis.

This object is solved according to the invention with a wheel set of the type named at the beginning in that the apex of the arched or V-shaped insert is faced to the hub boring.

The invention is based on the recognition that for the removal and substantial reduction of the disturbing oscillations a torsion elastic wheel having great axial and radial rigidity is needed. The torsion elasticity (small tangential rigidity) is attained in the wheel according to the invention in that the rubber elastic insert is only stressed in shear with regard to the axis of freedom in the tangential direction and because of the large radius of the rolling circle of the wheel having the effect of a lever arm is stressed with great strength. With regard to the two other axes of freedom the rubber insert is substantially only stressed by pressure. As the rubber insert can only give slightly in the direction of the pressure because its height is small and when yielding is restricted by the special shape of the contact surfaces of the wheel, a large radial and axial rigidity results for the wheel. The object of the invention could not be solved with the known rubber shock absorbent track wheels in which the rubber insert was arranged in the proximity of the wheel rim or in the middle of the wheel disc because these track wheels doe not simultaneously have a small tangential and large axial and radial rigidity. The insert of V-shaped cross section having its apex facing the rim acts in the known wheel like a cardan joint whereby it is mainly stressed in shear and not by pressure.

By a "small height" is meant a height small in relation to the wheel diameter. It is preferably 0.5 to 4%, especially 2% of the wheel radius.

In such a formation of the insert, which is arranged over its width in the axial direction at a varying distance from the wheel axis, a balance of its shear stressing can be attained in that the height of the rubber insert varies over the hub width so that it increases as the distance from the wheel axis increases.

Preferably the axial length of the apex and the inclination of the flanks of the insert are chosen as a function of the camber of the wheel and of the profile of the tread so that with radial forces the wheel rim does not move axially in relation to the wheel hub.

So that it is ensured in each case that the insert does not slip during use it is expediently fastened by its inner and outer side to the wheel, especially by adhesion or vulcanisation.

The construction of the wheel when applying initial stress is particularly simple if according to an embodiment of the invention the insert lies between an annular part and an outer second part composed of individual circular segments, the segments of the second part being arranged in the wheel by press fit.

This development of the invention is especially advantageous when the insert is to be vulcanised tightly to the whole inner and outer side at the wheel. The construction of the wheel is then effected so that before inserting the two parts holding the rubber elastic insert the annular crack formed by these parts is filled with molten rubber elastic material, a gap being left between the opposite front sides of the segments which is not filled with the rubber elastic material and which is substantially reduced, in particular to zero, when inserting the parts in the wheel for prestressing the insert.

The invention is explained in more detail as follows by means of drawings representing an exemplified embodiment. Individually FIG. 1 shows a wheel set having wheels sitting non-rotatably on the wheel set axis, FIG. 2 shows a wheel of the wheel set according to FIG. 1 in half axial section, FIG. 3 shows the wheel according to FIG. 2 in partial cross section according to the line I—I of FIG. 2.

Figure 2:
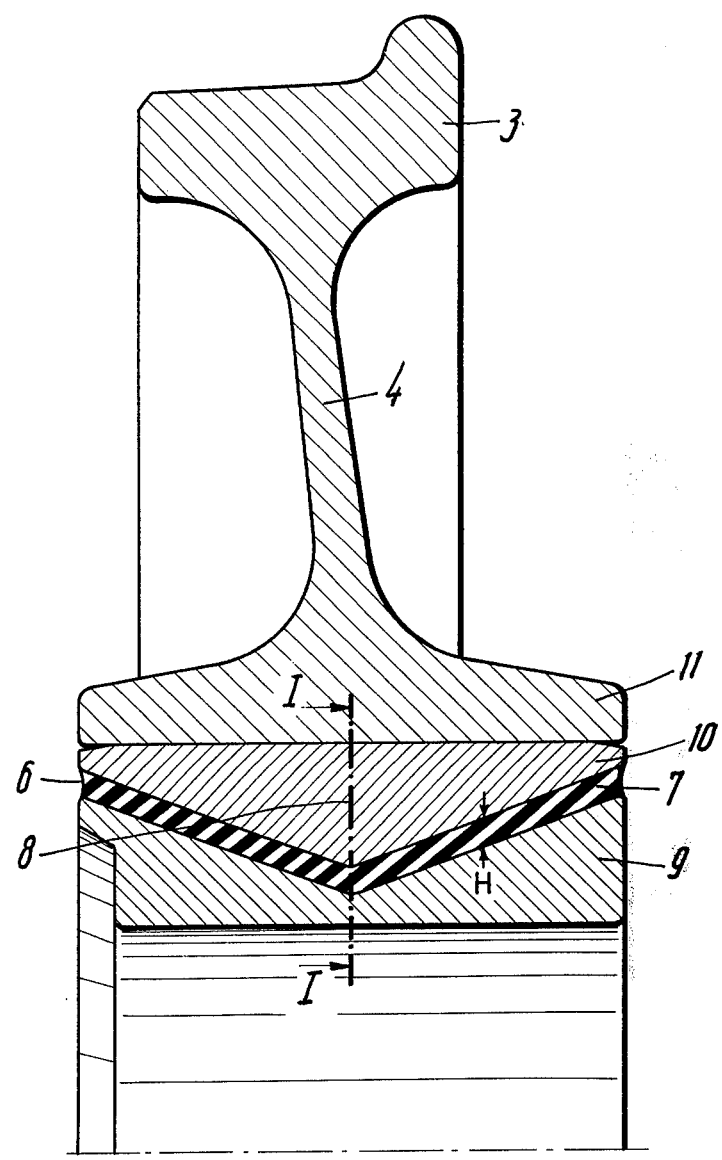
Figure 3:
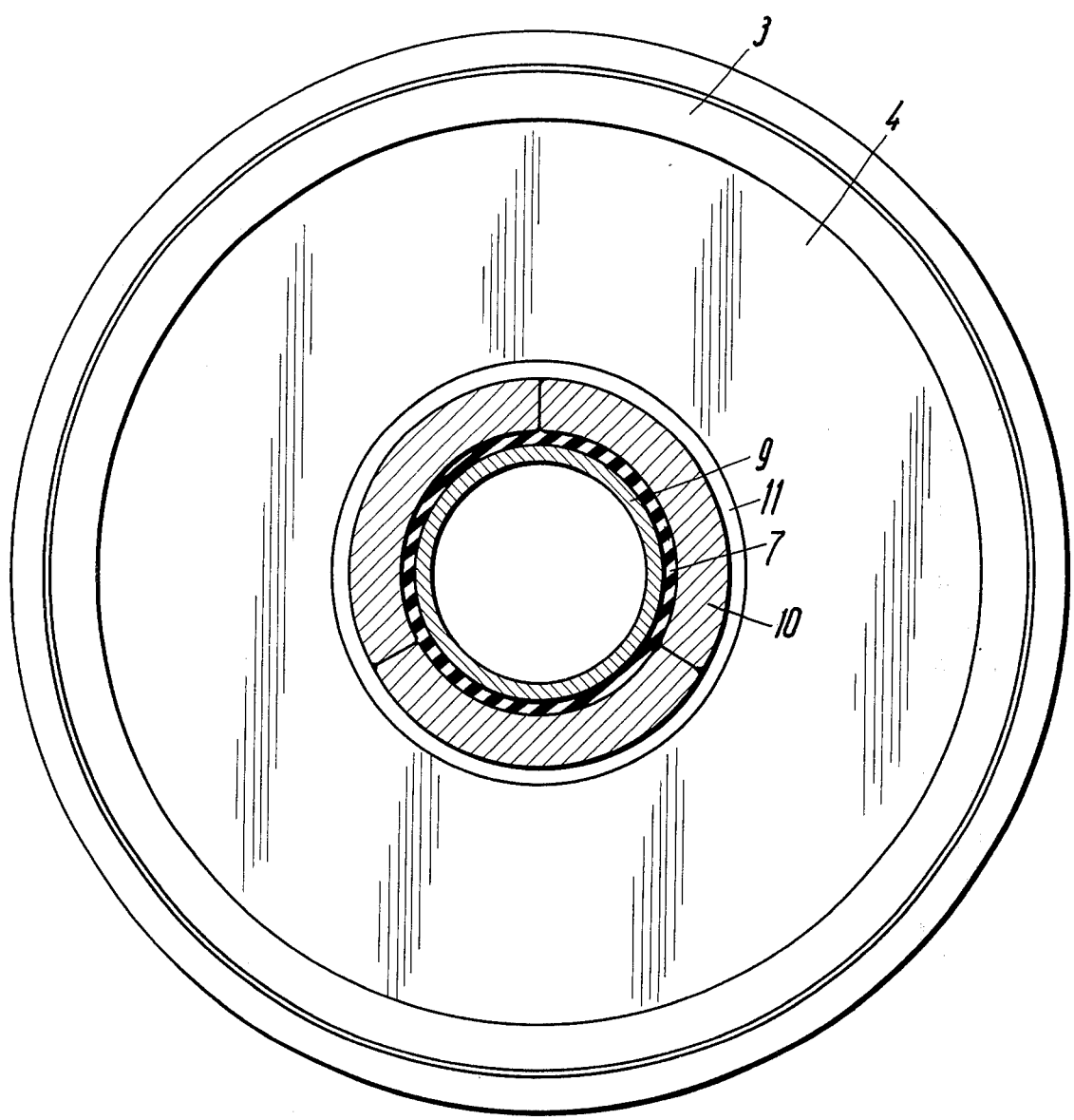
Figure 4:
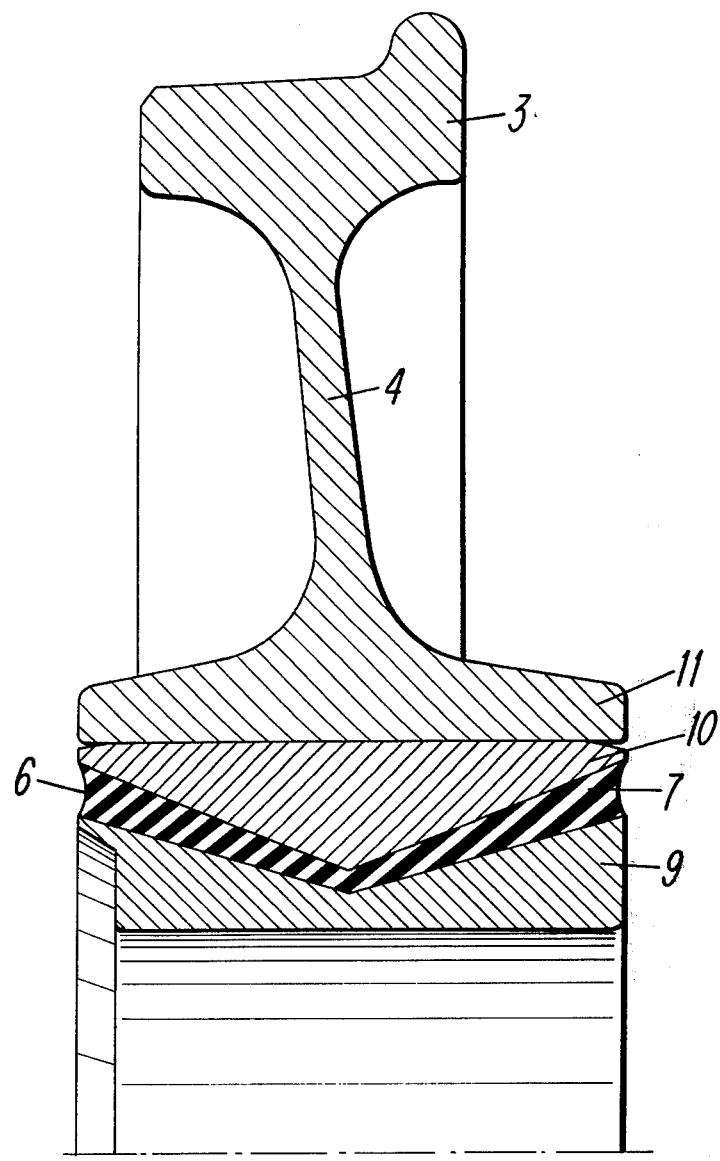

FIG. 4 is a sectional view of the wheel of FIG. 2, and shows the variation of the height of the rubber insert over the width of the wheel hub for balancing shear stress.

Each of the wheel sets of a bogie consists of a wheel axis 1 and two rubber sprung wheels 2 sitting non-rotatably on the wheel axis 1, e.g. by press fit or shrink fit. So that the wheels 2 can rotate the wheel axis is rotatably mounted in the bearings of the bogie frame.

Each wheel 2 consists of a wheel rim 3, a wheel disc 4 and a wheel hub 5. Embedded in the wheel hub 5 in an annular crack 6 arranged concentrically to the wheel axis 1 and extending over the total width of the wheel hub 5 is arranged an insert 7 of rubber elastic material. It is thin and arranged so that it has a small radial height H. The radial height H is approximately 0.5 to 4% of the wheel radius. It consists of a material having a hardness of between 40 to 80 Shore-D corresponding to hard rubber. By the fact that the insert 7 lies in the direct proximity of the wheel axis 1 and is stressed with great force in longitudinal direction acting in shear because of the effective large lever arm of the wheel disc 4, a small tangential rigidity results. Large rigidities result in the radial and axial direction because with forces effecting the wheel rim 3 axially or radially the insert is stressed by pressure.

The insert 7 is arranged inclined oppposingly symmetrically to the median plane 8 of the wheel hub 5 and having its apex directed towards the wheel hub 5. By this a favourable stressing of the insert 7 by pressure is attained with forces applied parallel to the axis 1 at the wheel rim 3 effecting a swing of the wheel 2. The symmetrical arrangement of the insert 7 when simultaneously in an inclined position can be effected in various ways. In the exemplified embodiment the insert 7 is V-shaped in the axial cross section. However an arched insert 7 is possible. The degree of inclination and the position of the apex depend on the desired rigidities in the various directions and the inclination of the wheel and the tread.

In the exemplified embodiment the wheel hub 5 is constructed of several parts. It consists of an inner one-piece annular part 9, an outer part 10 composed of several segments and a hub portion 11 holding the segments together at the inner edge of the wheel disc 4. Between the inner part 9 and the outer part 10 is embedded the insert 7 under considerable prestressing. The initial prestressing has the effect that the part 10 is held by press fit rotatably and axial-tight in the part 11.

The hub region can also be constructed differently from the prefered exemplified embodiment described. For example, the outer part 10 and the part 11 surrounding it can be in one piece while the inner part consists of two annular parts which can be axially joined to form a part corresponding to part 9. However the exemplified embodiment described in detail above is more advantageous because it enables the rubber elastic insert to have high initial stress with simple mounting and safe cohesion.

The construction of the wheel 2 results in the following way: Firstly the spaced adjacent sides of the individual segments of the outer part 10 are placed together to form a ring in the centre of which the inner part is placed coaxially. So that the fromt sides of the segments remain spaced from one another there are spacers between them.

If the segments are spaced the annular crack formed by the inner part 9 and the outer part 10 is filled with rubber elastic material to form the rubber elastic insert 7. This insert 7 is then vulcanised tightly to the inner or outer part 9, 10. The spacers between the front sides of the individual segments project somewhat into the annular gap so that in the region of the front sides thrusting against one another the spacers form cuts of slight depth in the rubber elastic material. After the removal of the spacers these cuts enable the compression of the rubber elastic insert 7 without leading to shearing stress of the rubber elastic insert 7 in the region of the front sides. After the removal of the spacers the parts 9, 10 connected with one another by the rubber elastic 7 are inserted into the wheel 2, the diameter of the outer part 10 being reduced so much by radial pressure on the segments that the part 10 can be pushed into the part 11. The initial stress in the rubber elastic insert has the effect that the outer part 10 sits fast in the part 11 in tangential and axial direction.

For purposes of balancing the shear stress of the rubber elastic insert 7 at varying distances from the wheel axle 1, the height of the insert 7 is made variable over the width of the wheel hub 5 so that it increases as the distance from the wheel axis increases (FIG. 4).

We claim:

1. Wheel set for a bogie of a track vehicle, comprising an axle rotatably mounted in bearings of a bogie, wheels mounted fixed to the axle, a substantially wide rubber elastic insert for springing each said wheels, said rubber elastic insert having an arched axial-radial cross-section, the height of the arch in radial direction being substantially small relative to the width of the arch, said insert being arranged between the wheel hub and wheel rim in the proximity of the hub boring and extending substantially over the whole width of the wheel hub, the apex of the arched insert facing the hub boring, and an outer part comprised of individual circular segments surrounding substantially said rubber elastic insert.

2. Wheel set according to claim 1, wherein to balance the shear stress of said rubber insert when at varying distances from the wheel axle, the height of the insert is variable over the width of the wheel hub so that it increases as the distance from the wheel axis increases.

3. Wheel set according to one of claims 1, wherein the rubber elastic insert is fixed at its inner and outer side to the wheel.

4. A wheel set for a bogie of a track vehicle as defined in claim 1 wherein to balance the shear stress of said rubber elastic insert when at varying distances form the wheel axle, the height of the insert is variable over the width of the wheel hub so that it increases as the distance from the wheel axis increases the rubber elastic insert being fixed at its inner and outer side to the wheels, said rubber elastic insert being arranged between an annular inner part and an outer part comprised of individual circular segments, the segments of the outer parts being arranged in the wheel by press fit.

5. Wheel set for a bogie of a track vehicle, comprising an axle rotatably mounted in bearings of a bogie, wheels mounted fixed to the axle, a substantially wide rubber elastic insert for springing each said wheels, said rubber elastic insert having an arched axial-radial cross section, the height of the arch in radial direction being substantially small relative to the width of the arch, said insert being arranged between the wheel hub and the wheel rim in the proximity of the hub boring and extending substantially over the whole width of the wheel hub, the apex of the arched insert facing the hub boring, the rubber elastic insert being arranged between an annular inner part and an outer part comprised of individual circular segments, the segments of the outer part being arranged in the wheel by press fit.

* * * * *